United States Patent [19]
Yamashita et al.

[11] Patent Number: 5,880,202
[45] Date of Patent: Mar. 9, 1999

[54] BLACK COATING COMPOSITION AND APPLICATION THEREOF

[75] Inventors: Toshinobu Yamashita, Amagasaki; Koji Tsujimoto, Suita; Toshiki Furubayashi, Hyogo-ken; Takeo Tokuda, Amagasaki; Kiyoharu Nakatsuka, Suita, all of Japan

[73] Assignee: Sumitomo Chemical Company, Limited, Osaka, Japan

[21] Appl. No.: 835,425

[22] Filed: Apr. 9, 1997

[30] Foreign Application Priority Data

Apr. 11, 1996 [JP] Japan .................................. 8-115307
Jun. 17, 1996 [JP] Japan .................................. 8-177057

[51] Int. Cl.$^6$ ........................................................ C08K 3/00
[52] U.S. Cl. ............................ 524/495; 524/496; 524/413; 524/418; 524/430

[58] Field of Search ........................................ 524/495, 496, 524/413, 430, 418

[56] References Cited

U.S. PATENT DOCUMENTS 5,464,898  11/1995  Ittmann et al. ........................ 524/493

*Primary Examiner*—Edward J. Cain
*Attorney, Agent, or Firm*—Stevens, Davis, Miller & Mosher, L.L.P.

[57] ABSTRACT

A black coating composition comprising a light-screening material and a macromolecular material wherein the light-screening material consists of particles having a multiple particle size distribution has high light-screening properties, is excellent in storage stability, dispersion stability and coating efficiency, and is satisfactory in other characteristics required of the light-screening thin film of a color filter used in a liquid crystal display device or the like.

12 Claims, No Drawings

BLACK COATING COMPOSITION AND APPLICATION THEREOF

The present invention relates to a black coating composition and application thereof. More particularly, the present invention relates to a black coating composition useful for forming a light-screening thin film for a color filter used in a liquid crystal display device (LCD), imaging device or the like, and a process for producing a color filter by the use of the black coating composition.

For improving the contrast and color purity of a color filter or preventing light leakage toward a switching device and the like of a color filter used in a liquid crystal display device or the like, the following methods, for example, are known: a light-screening thin film called black matrix is formed in the gaps between transparent, colored and fine patterns of red, green and blue colors, respectively, formed on a transparent substrate, or a light-screening thin film for screening unnecessary light is formed on a substrate located on the switching device.

In recent years, with a rapid increase of the size, output, etc. of LCD, there has been an increasing desire to seek further improvement in characteristics and productivity of light-screening thin films. For example, there have been desired not only high light-screening properties but also improved flatness and smoothness of a coating film and improved adhesive properties to a substrate and an overcoat (a protective film). In addition, there have recently been eagerly desired, in particular, reliability including heat resistance, water resistance, moisture resistance, alkali resistance, solvent resistance, liquid crystal resistance, etc.

As a material for forming such a light-screening thin film, metallic materials and resin-based materials have mainly been used. Chromium and the like are used as the metallic materials, and coating compositions containing a macromolecular material such as a resin and a light-screening material such as carbon black are used as the resin-based materials. Of these materials, the metallic materials such as chromium involve problems of environmental pollution, undesirably high light reflectance of the light-screening thin film formed, high production cost, etc. Therefore, the resin-based materials are noted at present.

The resin-based materials, however, are disadvantageous in being inferior to the metallic materials in light-screening properties. In attaining high light-screening properties by using the resin-based material, increasing the amount of the light-screening material added is effective. But, increasing the amount of the light-screening material added results in a high viscosity of the coating composition, low storage stability and low dispersion stability of the coating composition and in particular, a low coating efficiency, so that the following problems are caused: the productivity of a color filter is decreased and moreover the above-mentioned reliability of characteristics of the light-screening thin film are deteriorated.

In order to find an industrially advantageous resin-based material which has high light-screening properties, and is excellent in storage stability, dispersion stability and coating efficiency, and is satisfactory in various characteristics required of the light-screening thin film of a color filter used in a liquid crystal display device or the like, the present inventors have earnestly investigated and accomplished the present invention.

The present invention provides a black coating composition comprising a light-screening material and a macromolecular material, characterized in that the light-screening material consists of particles having a multiple particle size distribution.

The embodiments of the present invention are explained below in detail.

The light-screening material used in the present invention is not particularly limited in kind. The light-screening material includes, for example, carbon black, titanium black, metal oxides (e.g. black iron oxide), metal sulfides (e.g. bismuth sulfide), black organic pigments selected from pigments of perylene type, phthalocyanine type, anthraquinone type, dioxazine type, quinacridone type, azo type, isoindoline type, thioindigo type and the like (e.g. phthalocyanine black, nigrosine, aniline black and perylene black), black pigments comprising a plurality of chromatic organic pigments and the like. These light-screening materials may be used alone or in mixtures of two or more. The light-screening material can be appropriately selected from commercially available materials such as Special Black 550 (Degussa), Raven 410, 1250 and the like (Colombian Carbon), BY-004 (Mitsubishi Materials Corp.), Paliogen Black L0084 (BASF AG), etc.

When the coating composition of the present invention is used as a material for forming a light-screening thin film of a color filter, the use of carbon black, titanium black, organic pigments or mixtures thereof is especially suitable. As the organic pigments, perylene type pigments such as perylene black are especially suitable. When the light-screening materials are used in a mixture thereof, a mixture of titanium black and the organic pigment is especially suitable.

The mixing proportions of the organic pigment and titanium black can be properly determined in view of their type and properties. From a viewpoint of the dispersion stability of the black coating composition and the characteristics of the light-screening thin film formed from the composition, it is usually preferable to choose the proportions of the organic pigment and titanium black falling within the ranges of from 20 to 80 parts by weight and from 80 to 20 parts by weight, respectively, per 100 parts by weight of the mixture.

The light-screening material used in the present invention consists of particles having a multiple particle size distribution.

In the present invention, the term "a multiple particle size distribution" is intended to mean a combination of more than one normal, i.e. Gaussian, particle size distributions.

More particularly, the light-screening material used in the present invention consists of the one group of particles having a normal particle size distribution with a predetermined average particle size (hereinafter referred to as "distribution with a larger average particle size") and the other one or more groups of particles having each normal particle size distribution with each average particle size smaller than that of the distribution with a larger average particle size (hereinafter referred to as "distribution with a smaller average particle size").

In another aspect, the light-screening material satisfying the conditions described above is such that in a graph wherein the axis of ordinate refers to distribution (wt %/nm) and the axis of abscissa to particle size (nm), there is obtained either a curve with a plurality of peaks showing an average particle size, or a single peak and a longer fall toward the smaller particle size than the fall toward the larger particle size.

Although a particle size of the particles is not particularly limited, it is preferably about 700 nm or less, more preferably about 300 nm or less. The lower limit is usually about 5 nm.

An average particle size of a group of particles can be properly determined depending on the kind of the light-screening material to be used and the number of the groups of particles to be blended.

For example, when two groups of particles having the distribution with a larger average particle size and the distribution with a smaller average particle size, respectively, are blended, and when the average particle size of the distribution with a smaller average particle size is taken as 1, the average particle size of the distribution with a larger average particle size is preferably not less than about 4, and it is also preferably not more than about 50.

In this case, an average particle size of the distribution with a larger particle size is preferably about 50 nm or more, more preferably about 100 nm or more, and is usually about 500 nm or less. The proportion of the group of particles having the distribution with a smaller particle size is preferably from 1 to 40% by weight, more preferably from 5 to 30% by weight, based on the total weight of the two groups of particles.

In the present invention, the number of the groups of particles to be blended is not limited to the above two, and includes three or more.

The shape of the particles of the light-screening material used in the present invention is preferably spherical or nearly spherical. But, it is not limited thereto, and may be plate, rod, needle or the like.

The particle size and the particle size distribution can be determined by a method including, for example, liquid phase sedimentation method, small angle X-ray scattering method, X-ray transmission method, light scattering method, photon correlation method, specific surface area method and electron microscope method.

The light-screening material satisfying the conditions described above can be prepared by properly choosing a method for adjusting the particle size to a desired size so as to give the above-mentioned particle size distributions, or by properly choosing screening or classification conditions. It is also possible to prepare the desired light-screening material, for example, by adjusting the particles sizes to desired particle sizes by a conventional method to prepare two or more groups of particles having each normal distribution with a predetermined average particle size different from each other, and appropriately blending the thus prepared two or more groups of particles. In this case, the two or more groups of particles to be blended can be of either the same light-screening material or different light-screening materials in kind.

The macromolecular material used in the present invention may be any macromolecular material usually used in the art and includes, for example, thermosetting or photosensitive materials having characteristics such as heat resistance and solvent resistance.

The thermosetting materials include maleic oil resins, acrylic resins, polyester resins, polybutadiene resins, polyolefin resins, phenolic novolaks, cresol novolaks, polyimides, polyvinyl alcohols, modified acrylic resins, modified epoxy resins, modified silicone resins and the like.

The photosensitive materials include materials such as acrylic resins, polyester resins, polyimide resins, epoxy resins and the like. In industrial application, photosensitive materials known as positive or negative photoresists are suitable. The negative photoresists include acrylic resins containing a photoinitiator such as a benzophenone or an anthraquinone. Commercially available negative photoresists include V-259-PA (Shin-Nittetsu Kagaku), Kayarad INC-116 (Nippon Kayaku Co., Ltd.), etc.

The positive photoresists include phenolic novolak resins containing an esterified product of o-quinonediazide. Commercially available positive photoresists include OFPR-800 (Tokyo Ohka Kogyo Co., Ltd.), PF-7400 (Sumitomo Chemical Co., Ltd.), FH-2030 (Fuji Hunt Electronics Technology, Co., Ltd.), etc.

The mixing ratio of the light-screening material to the macromolecular material in the black coating composition of the present invention can be chosen in a wide range without a particular limitation. It can be properly chosen out of the wide range of from 10:90 to 80:20 by weight, usually from 20:80 to 70:30 by weight, depending on the kinds of light-screening material and macromolecular material and the purpose of use of the black coating composition of the present invention.

Depending on the purposes, the black coating composition of the present invention can contain, besides the light-screening material and the macro-molecular material, organic solvents (e.g. hydrocarbons, ethers, esters, ketones, alcohols and Cellosolves), water, and auxiliary additives such as pigments other than those mentioned above, photosensitizers, silane coupling agents, titanium coupling agents, aluminum coupling agents, dispersants, pH adjustors, defoaming agents, coating-spreading agents, etc.

The black coating composition of the present invention can easily be obtained by dispersing and mixing predetermined amounts of the light-screening material, the macromolecular material and optional solvents and additives with a roll mill, ball mill, sand mill, bead mill or the like.

The thus obtained black coating composition of the present invention is useful particularly for producing a substrate having on its surface a light-screening thin film called a black matrix. Such a light-screening thin film can be formed by a conventional method on a substrate which may have transparent, colored and fine patterns of, for example, red, green and blue colors, respectively, formed thereon. The light-screening thin film can be formed in the gaps between the transparent, colored and fine patterns before or after the formation of the transparent, colored and fine patterns, or alternatively, the light-screening thin film can be formed on another substrate, independent of the transparent, colored and fine patterns.

For example, a substrate having the light-screening thin film formed in the gaps between the transparent, colored and fine patterns can be produced by forming transparent, colored and fine patterns on a transparent substrate of glass or the like according to a conventional method such as printing method, photolithography method or electrodeposition method, and then forming a light-screening thin film using the black coating composition of the present invention by a conventional method.

The use of a black coating composition of the present invention having photosensitive properties in this case enables the production of a desirable substrate by a process well known as a so-called back exposure process which comprises forming desired transparent, colored and fine patterns on a transparent substrate, and then applying the black coating composition of the present invention on the whole surface of the substrate so as to cover the transparent, colored and fine patterns therewith, followed by exposure to light and development from the back of the substrate.

Prior to the present invention, the back exposure process with a conventional coating composition has frequently brought about insufficient film formation, undesirable formation of gaps between the light-screening thin film and the transparent, colored and fine patterns, undesirable formation of a light-screening thin film overlapping the transparent, colored and fine patterns, etc. The black coating composition of the present invention is characterized in that it permits the production of the desirable substrate without these problems.

Alternatively, a desirable substrate can be obtained by forming a light-screening thin film of a window frame shape at first and then forming transparent, colored and fine patterns each having a window shape, according to the process disclosed in U.S. Pat. No. 5,503,732.

The black coating composition of the present invention is excellent in coating efficiency even when the amount of the light-screening material added is increased for improving the light-screening properties, and said composition is excellent also in storage stability and dispersion stability. Moreover, employment of said composition makes it possible, irrespective of a forming method, to form a light-screening thin film which has high light-screening properties, is excellent in flatness and smoothness of the resulting coating film and in adhesive properties to the substrate and to the overcoat (a protective film), has a high reliability including heat resistance, water resistance, moisture resistance, alkali resistance, solvent resistance, liquid crystal resistance, etc., and has a predetermined precise shape. Furthermore, the substrate obtained by forming a light-screening thin film in spaces between the transparent, colored fine patterns by the use of the black coating composition of the present invention is free from light leakage and is excellent in surface flatness and smoothness. In addition, the substrate is free from light leakage not only when it is used alone but also when it is held between two polarizing plates and the axes of polarization of the polarizing plates are allowed to intersect at right angles. Therefore, a high-performance color filter can be produced, so that a liquid crystal display device having a superior display quality can be produced.

The present invention is illustrated in further detail with the following examples, which should not be construed as limiting the scope of the invention. In the examples, parts are all by weight.

EXAMPLE 1

As light-screening materials, 7 parts of carbon black powder having an average particle size of 25 nm (Special Black 550, mfd. by Degussa) and 18 parts of a black organic pigment having an average particle size of 130 nm (Paliogen Black L0084, mfd. by BASF AG) were premixed with 75 parts of a photosensitive resin (Kayarad INC-116N, mfd. by Nippon Kayaku Co., Ltd.) and 50 parts of propylene glycol monomethyl ether as a solvent. The resulting mixture was subjected to dispersing treatment with a triple roll mill. Then, 5 parts of a photoinitiator (Irgacure 907, mfd. by Ciba Geigy Ltd.) was added thereto, followed by thorough mixing, whereby a black coating composition was obtained.

The composition obtained was applied on a glass substrate with a roll coater, predried at 95° C. for 10 minutes, exposed to light from an ultra-high pressure mercury lamp at an exposure dose of 200 to 2,500 mJ/cm$^2$ through a photomask having a predetermined pattern, and then developed with butyl Cellosolve to form a light-screening thin film.

In the above procedure, the properties of the black coating composition were satisfactory and were stable for a long period of time, and its coating efficiency was so high that the coating operation was smooth. Moreover, the light-screening thin film formed was excellent in properties as that for a color filter.

EXAMPLE 2

The same procedure as in Example 1 was repeated except for replacing the light-screening materials by 6 parts of Raven 1250 (carbon black powders mfd. by Colombian Carbon; average particle size: 20 nm) and 19 parts of Raven 410 (carbon black powders mfd. by Colombian Carbon; average particle size: 101 nm) to obtain a black coating composition.

The properties and coating efficiency of the thus obtained black coating composition estimated by forming a light-screening thin film in the same manner as in Example 1 were both found to be excellent.

EXAMPLE 3

The same procedure as in Example 1 was repeated except for replacing the light-screening materials by 25 parts of titanium black powder which had multiple particle size distributions and was composed of 30% by weight of powder having a particle size distribution with an average particle size of about 30 nm and the balance, i.e., 70% by weight of powder having a particle size distribution with an average particle size of about 180 nm, the particle size falling within the range of from 10 to 500 µm, to obtain a black coating composition.

The properties and coating efficiency of the thus obtained black coating composition estimated by forming a light-screening thin film in the same manner as in Example 1 were both found to be excellent.

EXAMPLE 4

With a bead mill and the like was carried out the dispersion of 100 parts by weight of a composition consisting of a pigment mixture of 9.3 parts by weight of Paliogen Black L0084 having an average particle size of 520 nm (perylene black, mfd. by BASF AG) and 24.8 parts by weight of BY-004 having an average particle size of 130 nm (titanium black, mfd. by Mitsubishi Materials Corp.), 28 parts by weight of INC-116N (an acrylic negative photoresist composition, mfd. by Nippon Kayaku Co., Ltd.), 33.5 parts by weight of propylene glycol monomethyl ether and 4.4 parts by weight of diethylene glycol monobutyl ether. To the resulting dispersion was added 0.5 part by weight of Irgacure #907 (a photopolymerization initiator mfd. by Ciba Geigy Ltd.), and thoroughly stirred. Thus, a black coating composition of the present invention was obtained.

On the other hand, there was prepared a glass substrate carrying 80-µm-wide strips of transparent electroconductive ITO film at 20-µm intervals. The surface resistivity of the electroconductive film was about 60 Ω/cm$^2$. Electrodeposition was carried out on the transparent substrate at 40 to 80V for 10 to 20 seconds by using a blue coating material for electro-deposition prepared from 25 parts by weight of Rionol Blue ES (mfd. by Toyo Ink Mfg. Co., Ltd.) and 75 parts by weight of Esbia #3000 Clear (an electrophoresable thermosetting resin mfd. by Shinto Paint Co., Ltd.). The thus treated transparent substrate was washed with water and then heat-treated at 200° C. for 30 minutes to obtain a transparent, colored and fine pattern of about 1.5 µm thickness.

The black coating composition obtained above was applied on the whole surface carrying the transparent, blue-colored and fine pattern of the above-mentioned glass substrate by screen printing and prebaked at 90° C. for 10 minutes to obtain a coating film of about 8 µm thickness. The side opposite to the coating film-carrying surface of the substrate was exposed to light from a high pressure mercury arc lamp at an illuminance of 80 W/cm$^2$ for 3 to 20 seconds. Then, the substrate was immersed in butyl Cellosolve at ordinary temperature for 2 minutes to remove the unexposed portion of the coating film, after which the substrate was washed with deionized water and heat-treated at 200° C. for 30 minutes.

Thus, there was obtained a substrate having on its surface the transparent, colored and fine pattern and a light-screening thin film of about 1.5 µm thickness formed in spaces between the patterned strips.

The substrate obtained showed no light leakage at the boundary between the light-screening thin film and the colored fine pattern and had flat and very uniform surfaces. Furthermore, high light-screening properties could be attained without light leakage both when the substrate was used alone and when the substrate was held between two polarizing plates and the axes of polarization of the polarizing plates are allowed to intersect at right angles. Thus, the substrate was satisfactory as a color filter. In addition, the black coating composition obtained above had a high coating efficiency and was so good also in stability that there was no deterioration even after storage in a cold and dark place for a month.

The entire disclosure of Japanese Patent Application Nos. 8-115307 and 8-177057 filed on Apr. 11, 1996 and Jun. 17, 1996, respectively, including specification, claims and summary are incorporated herein by reference in their entirety.

What is claimed is:

1. A light-screening thin film comprising a macromolecular material and a light-screening material consisting of particles having a multiple particle size distribution.

2. A process for forming a light-screening thin film comprising coating a substrate with a composition comprising a macromolecular material and a light-screening material consisting of particles having a multiple particle size distribution.

3. A process for producing a color filter comprising coating a substrate with a composition comprising a macromolecular material and a light-screening material consisting of particles having a multiple particle size distribution to form a light-screening thin film.

4. The thin film according to claim 1, wherein the particles have a particle size of about 700 nm or less.

5. The process according to claim 2, wherein the particles have a particle size of about 700 nm or less.

6. The process according to claim 3, wherein the particles have a particle size of about 700 nm or less.

7. The thin film according to claim 1, wherein the macromolecular material is one selected from the group consisting of thermosetting and photosensitive materials.

8. The process according to claim 2, wherein the macromolecular material is one selected from the group consisting of thermosetting and photosensitive materials.

9. The process according to claim 3, wherein the macromolecular material is one selected from the group consisting of thermosetting and photosensitive materials.

10. The thin film according to claim 1, wherein a weight ratio of the light-screening material to the macromolecular material is from 10:90 to 80:20.

11. The process according to claim 2, wherein a weight ratio of the light-screening material to the macromolecular material is from 10:90 to 80:20.

12. The process according to claim 3, wherein a weight ratio of the light-screening material to the macromolecular material is from 10:90 to 80:20.

* * * * *